US012748198B2

(12) United States Patent
Wintermantel

(10) Patent No.: US 12,748,198 B2
(45) Date of Patent: Sep. 29, 2026

(54) COHERENT LIDAR SYSTEM FOR CAPTURING THE SURROUNDINGS WITH PHASE MODULATION AND HARDWIRED DIGITAL CIRCUIT

(71) Applicant: Continental Autonomous Mobility Germany GmbH, Ingolstadt (DE)

(72) Inventor: Markus Wintermantel, Lindau (DE)

(73) Assignee: AUMOVIO Autonomous Mobility Germany GmbH, Ingolstadt (DE)

( * ) Notice: Subject to any disclaimer, the term of this patent is extended or adjusted under 35 U.S.C. 154(b) by 445 days.

(21) Appl. No.: 18/392,241

(22) Filed: Dec. 21, 2023

(65) Prior Publication Data

US 2024/0210538 A1 Jun. 27, 2024

(30) Foreign Application Priority Data

Dec. 22, 2022 (DE) ..................... 10 2022 214 276.4

(51) Int. Cl.
*G01S 7/493* (2006.01)
*G01S 7/4912* (2020.01)
*G01S 7/4914* (2020.01)
*G01S 17/931* (2020.01)

(52) U.S. Cl.
CPC ............ *G01S 7/493* (2013.01); *G01S 7/4914* (2013.01); *G01S 7/4917* (2013.01); *G01S 17/931* (2020.01)

(58) Field of Classification Search
CPC ...... G01S 7/493; G01S 7/4914; G01S 7/4917; G01S 17/931; G01S 17/42; G01S 17/58; G01S 7/4915; G01S 17/32
See application file for complete search history.

(56) References Cited

U.S. PATENT DOCUMENTS 9,791,551 B1 * 10/2017 Eshraghi ................. G01S 7/038
10,036,801 B2 * 7/2018 Retterath .............. G01S 7/4865
11,668,829 B2 * 6/2023 Schoenlieb ............. G01S 17/89 356/5.1
2016/0266242 A1 * 9/2016 Gilliland ............... G01S 17/931
2019/0094346 A1 * 3/2019 Dumoulin ............... G01S 17/42
2019/0227172 A1 * 7/2019 Schaefer ............... G06T 3/4053
2021/0018604 A1 1/2021 Barber et al.
(Continued)

FOREIGN PATENT DOCUMENTS

DE 10062759 A1 8/2002
WO WO-2017050633 A1 * 3/2017 ........... G01S 17/894

OTHER PUBLICATIONS

Search Report dated Sep. 28, 2023 from corresponding German patent application No. 10 2022 214 276.4.

*Primary Examiner* — Fernando Alcon

(57) ABSTRACT

A coherent lidar system for capturing the surroundings is configured to emit a phase-modulated signal with pseudo-random change over discrete phase values. The system receives the signals reflected back from objects and converts the signals into a low-frequency signal by mixing and digitizing. The system includes a digital signal processing for correlation filtering of the low-frequency received signal. At least a part of the two-dimensional correlation filter is realized by a hardwired digital circuit embodied as a pipeline, wherein multiple or all of the output values are determined per clock frequency of the digital circuit in one of the two dimensions, and over a sequence of clock frequencies in the other dimension.

11 Claims, 8 Drawing Sheets

(56) References Cited

U.S. PATENT DOCUMENTS

| | | | | |
|---|---|---|---|---|
| 2021/0033711 | A1* | 2/2021 | Helsloot | G01S 7/4817 |
| 2021/0109199 | A1* | 4/2021 | Hennecke | G01S 17/10 |
| 2022/0187590 | A1* | 6/2022 | Brunner | G01S 17/42 |

* cited by examiner e(n) is initially loaded into registers; thereafter, the structure is cycled M times, m=0, ..., M-1 with M=250

COHERENT LIDAR SYSTEM FOR CAPTURING THE SURROUNDINGS WITH PHASE MODULATION AND HARDWIRED DIGITAL CIRCUIT

CROSS-REFERENCE TO RELATED APPLICATIONS

This application claims priority to German patent application No. 10 2022 214 276.4, filed on Dec. 22, 2022, which is hereby incorporated by reference.

TECHNICAL FIELD

The technical field relates to a coherent lidar system for capturing the surroundings of a motor vehicle.

BACKGROUND

Motor vehicles are increasingly being equipped with driver assistance systems which capture the surroundings with the aid of sensor systems and deduce automatic reactions of the vehicle and/or instruct the driver as a result of the traffic situation recognized therefrom. A distinction is made between comfort and safety functions.

By now, however, developments have gone in an even more far-reaching direction. The driver is no longer only assisted, but rather the driver's task is increasingly being handled autonomously by the vehicle, i.e., the driver is being increasingly replaced; this is referred to as autonomous driving.

In particular, autonomous driving requires sensors with information about the surroundings which is highly accurate and easy to evaluate by machines. Radar systems are limited in their angular accuracy and separation capability and cannot satisfactorily meet these high capturing requirements on their own or even in combination with camera systems, at least not yet. For this reason, lidar systems, which have a similarly high angular resolution (horizontally and vertically) to a camera, but which additionally supply distance information and separation capability in each pixel, are also deployed in parallel. Today, so-called time-of-flight lidar systems which deal with electromagnetic radiation in the sense of particles and which can, thus, only measure the distance, but not the relative speed directly, are mostly deployed. However, the focus is now also increasingly on coherent lidar systems which deal with electromagnetic radiation in the sense of waves (like radar systems) and, therefore, can also directly measure the relative speed of objects via the Doppler effect. A further advantage of coherent lidar systems is that they have a higher sensitivity at higher distances and, therefore, allow higher ranges. In addition, coherent lidar systems are credited with a higher potential for high semiconductor integration, which promises lower manufacturing costs.

In the case of coherent lidar systems, the emitted electromagnetic wave is modulated, i.e., it alters in at least one of the parameters of amplitude, frequency or phase over time—otherwise no distance measurement would be possible. The most commonly used modulation in coherent lidar systems is the linear frequency modulation (FMCW=frequency modulated continuous wave), which mostly consists of two frequency ramps, the slopes of which have opposite algebraic signs. Admittedly, this modulation does have ambiguity problems in particular in the case of multiple reflections in the same beam direction and, in addition, the production of a highly linear frequency alteration is elaborate. The disadvantages do not occur or occur less in the case of a phase modulation (e.g., with pseudo-random change over discrete phase values), but the digital evaluation of the received signals is, admittedly, more elaborate and the approaches proposed in the prior art are associated with disadvantages, in particular in terms of sensitivity and, therefore, range.

As such, there is an opportunity to provide a coherent lidar system with phase modulation for the digital evaluation of the received signals, which makes possible maximum possible detection sensitivity, accuracy and separation capability.

SUMMARY

A coherently working lidar system for capturing the surroundings of a vehicle initially emits a phase-modulated signal, in particular with pseudo-random change over discrete phase values, wherein the signals reflected back from objects, which are delayed with respect to the emitted signal by the distance-dependent transit time and are shifted in frequency by the relative speed-dependent Doppler effect, are received and are converted into a low-frequency signal by mixing and digitized. The lidar system additionally has digital signal processing means for correlation filtering of the low-frequency received signal or it includes these, in particular in order to guarantee as accurate a determination as possible (i.e., high sensitivity and range) of the lidar system, wherein the correlation filtering is two-dimensional due to the two dimensions of time shift and frequency shift of signals reflected by objects, which are not known initially or from the start of the measurement (i.e., a priori). According to the invention, at least a part of the two-dimensional correlation filter is realized by a hardwired digital circuit (i.e., implemented in the hardware and not to be altered), which is embodied as a pipeline (i.e., a calculation based on multiple stages separated by buffer memories or at least partial performance of the correlation filtering), wherein multiple or all of the output values are determined per clock frequency of the digital circuit in one of the two dimensions, and over a sequence of clock frequencies in the other dimension.

In the case of the lidar system, the signal multiplications required for a spectral transformation can be expediently realized with twiddle factors in the hardwired digital circuit by a few additions and/or subtractions of shifted signal values, wherein a maximum of one addition or subtraction may be utilized in order to realize a real-valued multiplication.

The bit length used may change over the pipeline stages of the hardwired digital circuit and may be, in each case, only large enough for the quantization noise produced in the digital circuit to not significantly increase the system noise which arises in the analog part of the receiver.

According to one configuration of the lidar system, the hardwired digital circuit has a front stage, in which the signal sequence or the complex-conjugated values thereof and modulation sequence or the complex-conjugated values thereof are multiplied by a position which is shifted with respect to one another, if necessary followed by a decimation of the sequence arising from the multiplication and/or, if necessary, followed by an extension with zeroes (zero padding) and followed by a fast Fourier transform realized in multiple stages (FFT), wherein each individual computing operation is realized in a dedicated circuit and the shift between the signal and modulation sequence is altered from clock frequency to clock frequency in the first stage and the result of a Fourier transform arises at the output of the rear stage, wherein the result refers in each case to multiple cycles of previously produced output data of the front stage.

A binary phase modulation which additionally includes two phase positions which differ by approximately 180° may be utilized, with which the multiplications can be realized with the values of the modulation sequence by switchable inverters.

The fast Fourier transform can be expediently executed in the form of a structure with decimation in frequency, in order to avoid a resorting of the input data in the form of long lines, and in order to have or arrange the longest lines of the structure and the nontrivial multiplications in the front stages with their lower bit length.

According to an advantageous configuration, the hardwired digital circuit can have a front stage, in which a Fourier transform of a signal sequence or the complex-conjugated values thereof and a Fourier transform of the modulation sequence or the complex-conjugated values thereof are multiplied by a position which is shifted with respect to one another, if necessary followed by a decimation of the sequence arising from the multiplication and/or, if necessary, followed by an extension with zeroes (zero padding) and followed by an inverse fast Fourier transform realized in multiple stages, wherein each individual computing operation is realized in a dedicated circuit, the shift between the two Fourier transforms is altered from clock frequency to clock frequency in the first stage and the result of an inverse Fourier transform arises at the output of the rear stage, wherein the result refers in each case to multiple cycles of the previously produced output data of the front stage.

A truncation may be expediently utilized for quantizing and/or purely bit inversion can be expediently utilized for inversion, in the hardwired digital circuit, wherein the effects of the mean errors arising are compensated for by addition of correction values in a stage of the digital circuit.

Components of couplings and reflections within the lidar system or its immediate surroundings, in particular a cover, which are contained in the digitized received signal, are eliminated to a large extent by addition or subtraction of a compensation signal.

The hardwired digital circuit may additionally be utilized for multiple or all of the pixels by virtue of its high throughput rate, wherein the pixels can be generated in particular by scanning light rays and/or parallel receive paths.

The hardwired digital circuit may be expediently extended by one or more further stages in order to evaluate the result of the correlation filtering, in particular for absolute-value or power formation and downstream totaling and/or searching for the maximum.

Figure 6:
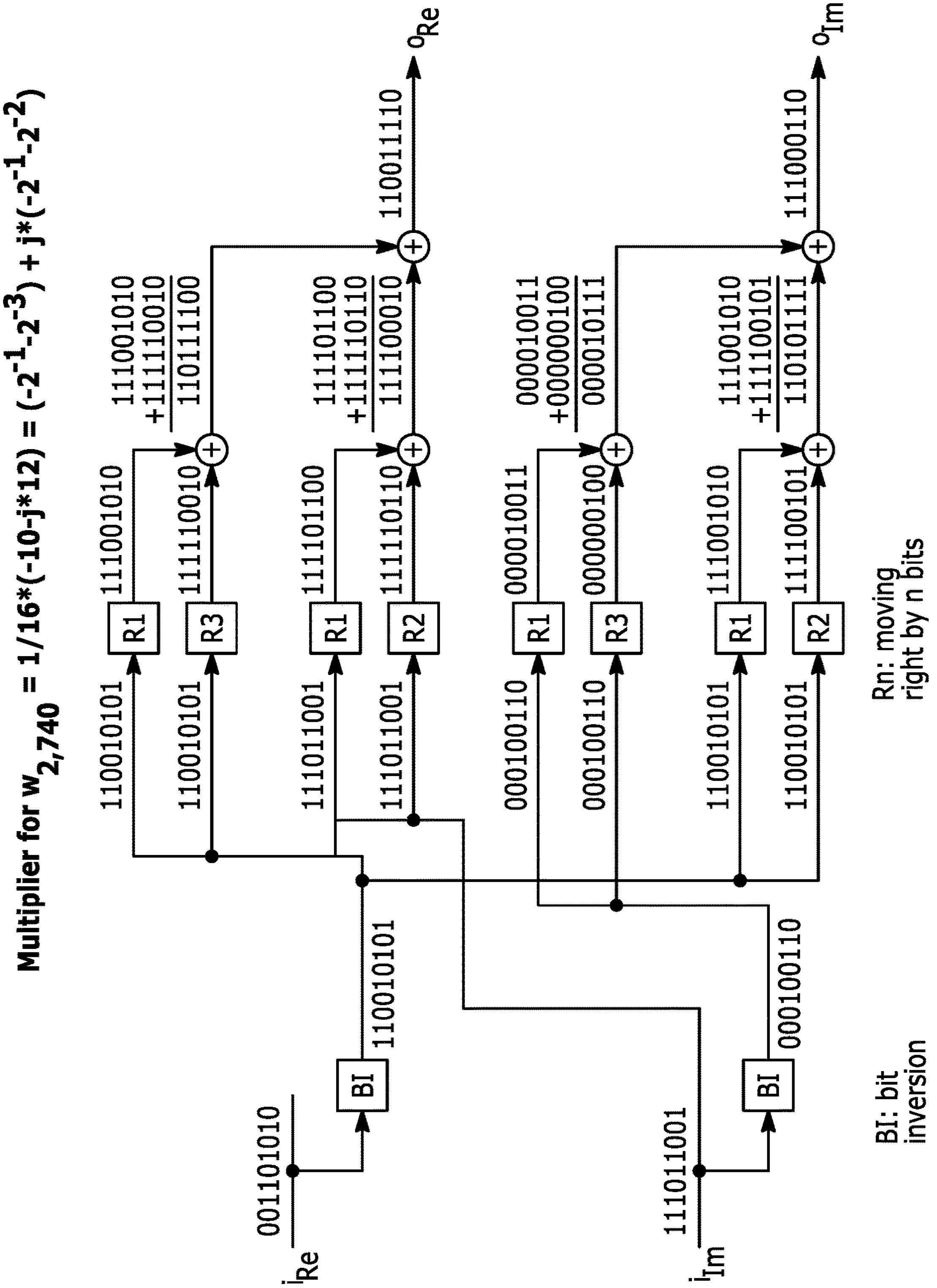

The expenditure-optimized realization of a complex-valued multiplier for an exemplary twiddle factor is depicted in FIG. 6.

DETAILED DESCRIPTION

Figure 1:
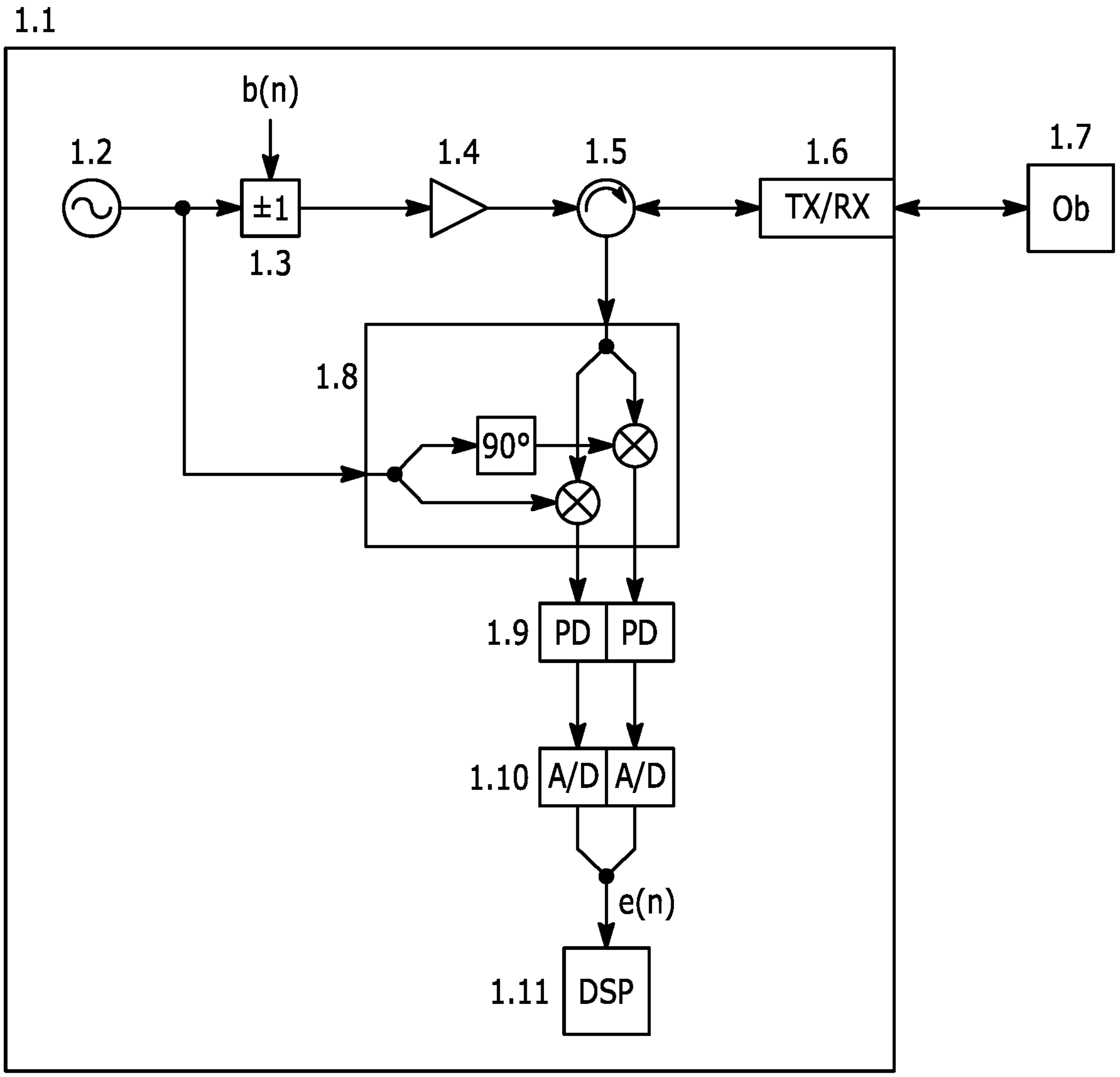
FIG. 1 shows the coherent lidar system with binary phase modulation.
Figure 2:
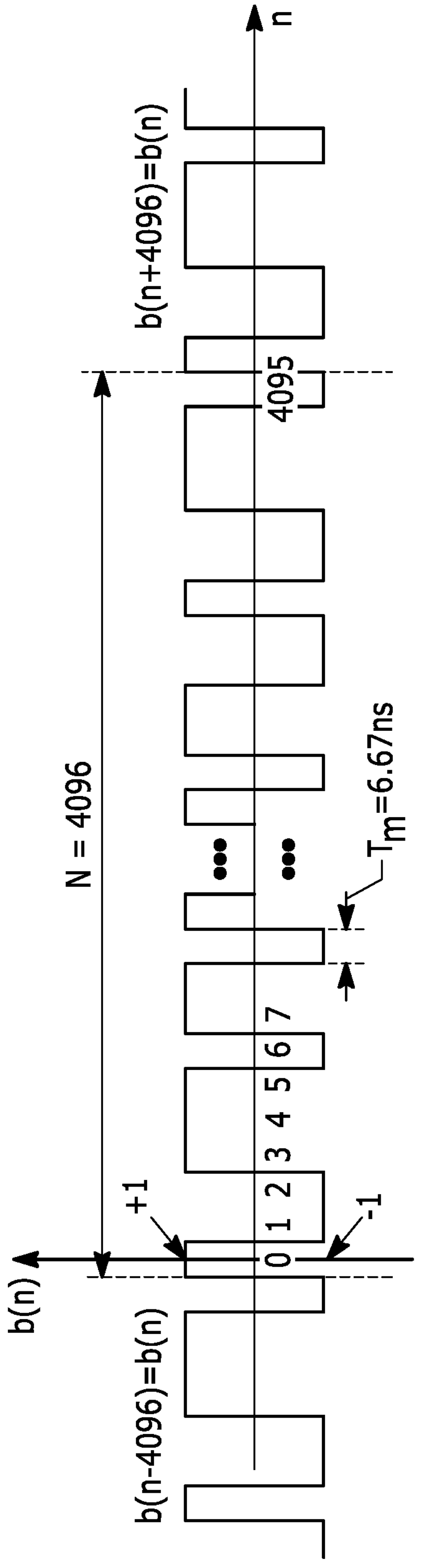
FIG. 2 shows the progress of a pseudo-random binary phase modulation.
Figure 3:
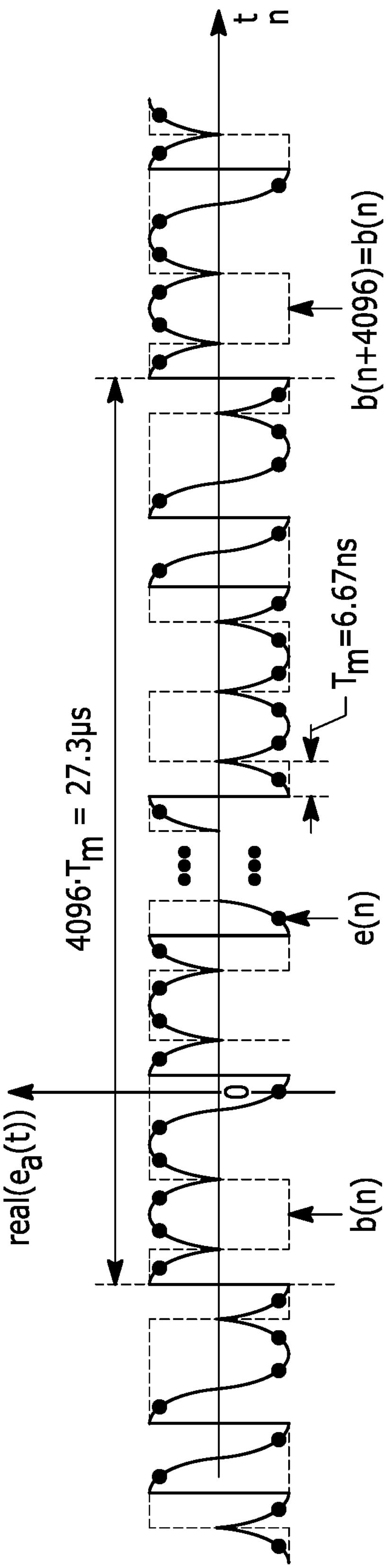
In FIG. 3, the real part of the low-frequency, analog received signal for one object is depicted.

FIG. 1 schematically shows a coherent lidar system 1.1. A coherent signal in the wavelength range of roughly λ=1550 nm is produced with the laser source 1.2; the coherence length is at least multiple microseconds and the frequency is constant. Subsequently, the signal enters a switchable inverter 1.3, with which the algebraic sign of the signal can be altered, which corresponds to a phase shift of 180°. Alterations in algebraic sign only take place in a fixed raster of, e.g., 6.67 ns and are pseudo-random, i.e., the algebraic sign is only altered with a rate or probability of 50% following $T_m$=6.67 ns. In FIG. 2, a progress of the modulation sequence b(n), which consists of the values +1 and −1 and is also referred to as binary, is depicted; it is repeated with the period N=4096, that is to say every 27.3 μs. The modulated signal passes through an amplifier 1.4, a circulator 1.5 (that is to say, a transceiver switch), is radiated via a transceiver unit 1.6 and partially reflected back from an object 1.7, with a delay which is dependent on the object distance d and, therefore, variable $$t_0 = 2d/c, \tag{1a}$$

wherein c=3.108 m/s is the speed of light, and with a frequency shift which is dependent on the radial relative speed v and, therefore, variable, which is produced by the Doppler effect $$f_D = 2v/\lambda \tag{1b}$$

the signal is then acquired by the transceiver unit 1.6 and is routed via the circulator 1.5 into the further receive path. In a complex-valued mixer 1.8, the modulated received signal is superimposed with the unmodulated laser signal and is converted with the aid of the photodiode unit 1.9 into a complex-valued, low-frequency signal; the frequency of the signal corresponds to the Doppler shift, the modulation of the signal is delayed by the signal transit time with respect to that of the transmit signal. In FIG. 3, the real part of the low-frequency, analog received signal $e_a$(t) is depicted in the case of one object. Subsequently, the signal is sampled and digitized in an analog-to-digital convertor unit 1.10 with the sampling frequency $f_s$=150 MHz, i.e., every $T_s$=6.67 ns—the resulting values of the real part are characterized in FIG. 3 as points. The complex-valued sampling signal e(n) can be described as follows:

$$e(n) = a \cdot b(n - m_0) \cdot \exp(2\pi j \cdot n/N \cdot k_0), \tag{2a}$$

wherein it is assumed here that the transit time to is an integral multiple $m_0$ of the modulation time $T_m$=6.67 ns:

$$m_0 = t_0/T_m, \tag{2b}$$

and $$k_0 = N \cdot T_s \cdot f_D \tag{2c}$$

which corresponds to the Doppler shift is likewise integral; a is the complex-valued amplitude of the received signal, "exp" denotes the exponential function and j is the imaginary unit.

The complex-valued received signal e(n) according to (2) relates to an individual object without a longitudinal extent, and to an ideal receiver. In actual fact, there can be multiple and/or extended objects, and an additional noise r(n) is generated in the receiver, in particular due to thermal noise; this then produces the received signal $$e(n) = sum_{i=1,\dots,l}\left[a_i \cdot b(n - m_{0,i}) \cdot \exp\left(2\pi j \cdot n/N \cdot k_{0,i}\right)\right] + r(n), \tag{3}$$

wherein "$sum_{i=1,\dots,l}$" constitutes the sum function over the index i=1, . . . , l of the l non-extended individual objects.

The discrete transit times $m_{0,i}$ and the discrete Doppler shifts $k_{0,i}$ of the l objects are to be established from the received signal e(n) of the period of time n=0, 1, . . . , N−1. For a determination which is as accurate as possible, that is to say a separation of the signal and noise which is as good as possible and, therefore, for maximum sensitivity and range of the lidar system, so-called optimal filtering is to be applied, that is to say filtering by correlation between the received signal e(n) and the two-dimensional space $\hat{e}_{m,k}(n)$ of the possible ideal amplitude-standardized received signals of an individual object:

$$\hat{e}_{m,k}(n) = b(n-m)\cdot\exp\left(j2\pi\cdot n/N\cdot k\right) \text{ with } m = 0, \dots, M-1 \text{ and } k = 0, \dots, N-1; \tag{4}$$

Figure 4:
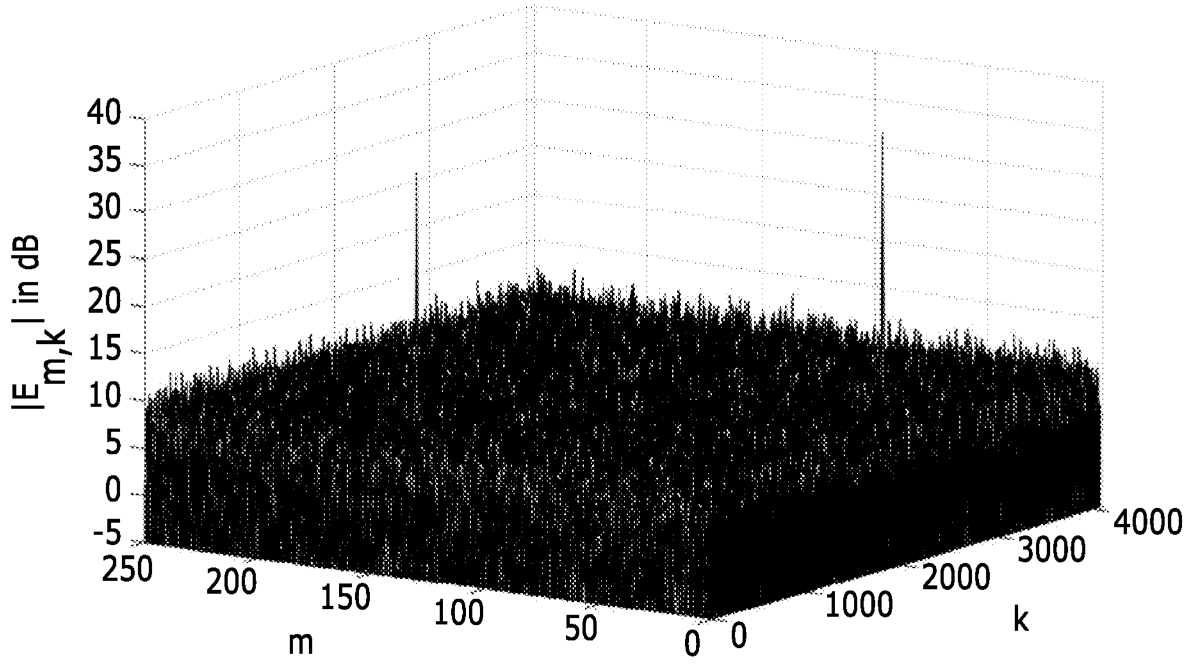
FIG. 4 shows the two-dimensional correlation of the received signal for two objects.
Figure 5A:
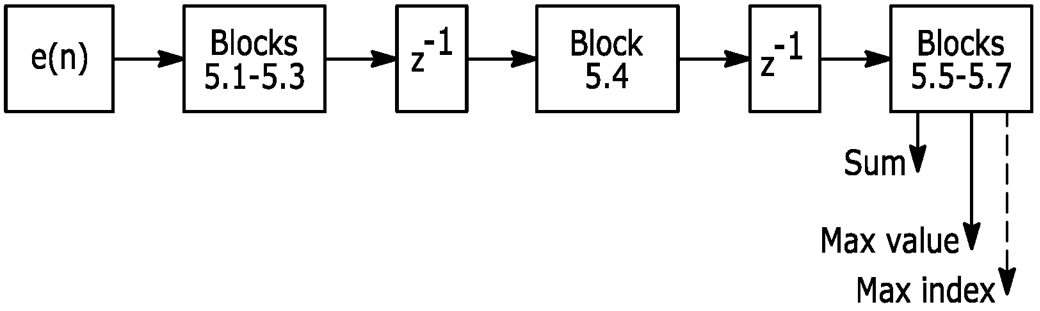
FIG. 5*a* shows an overview and, for reasons of clarity, the three blocks from FIG. 5*a* are depicted in detail in FIGS. 5*b*-5*d* (reference is constantly made to FIG. 5, which comprises FIGS. 5*a*-5*d*, in the description of the exemplary embodiments).
Figure 5B:
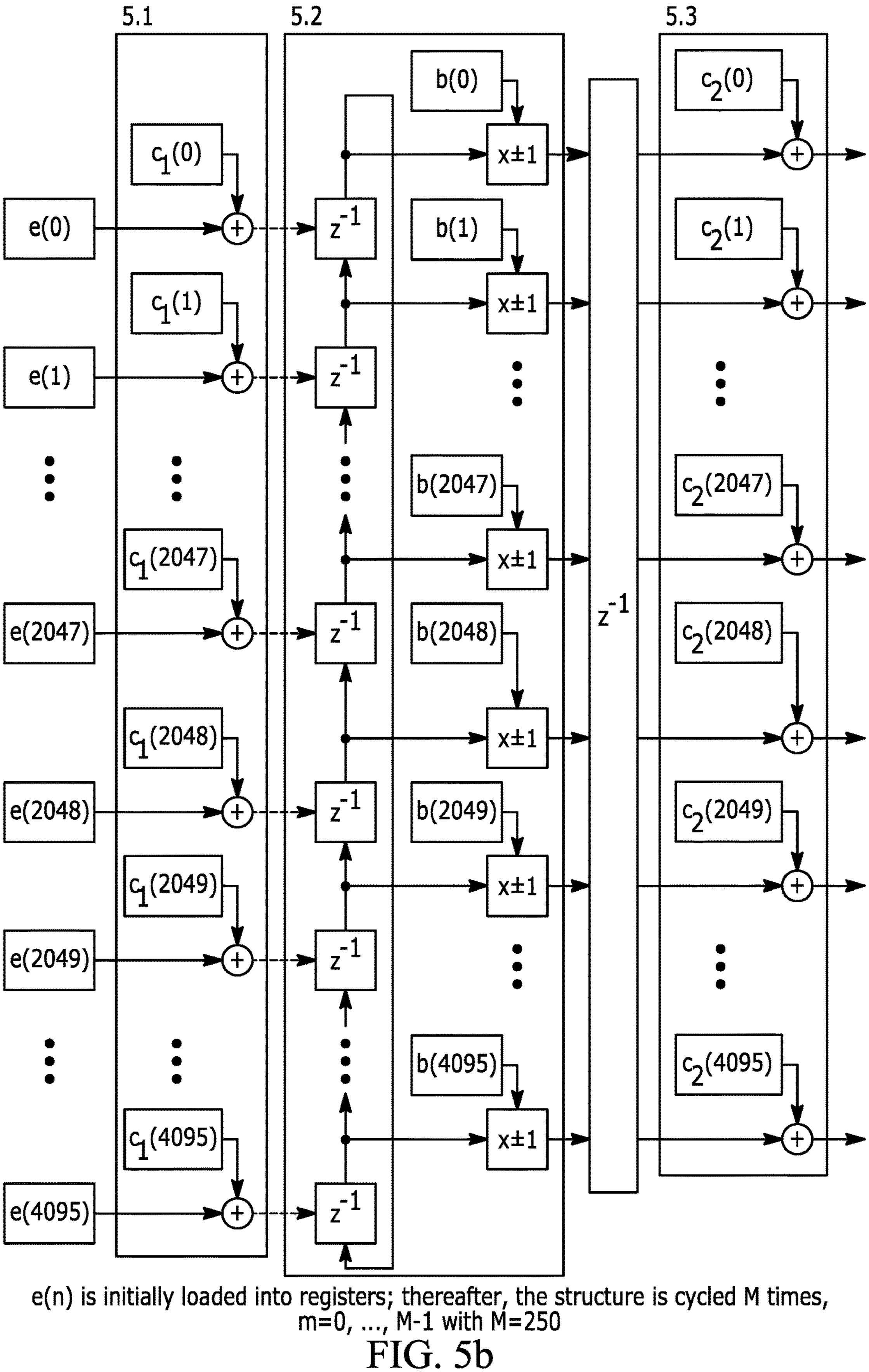
FIG. 5 shows the expenditure-optimized hardwired digital circuit for realizing the two-dimensional correlation filtering.
Figure 5C:
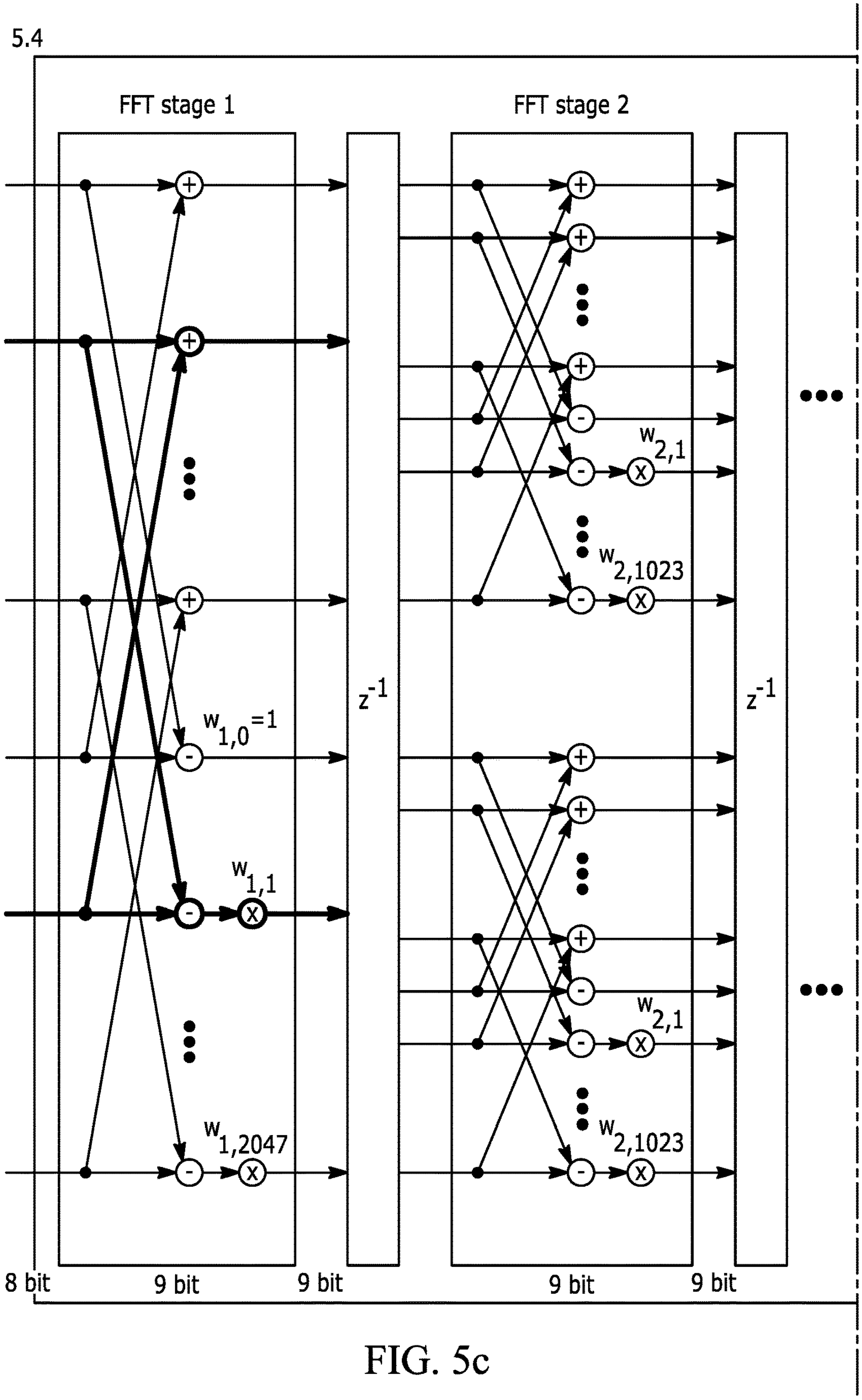
Figure 5C:
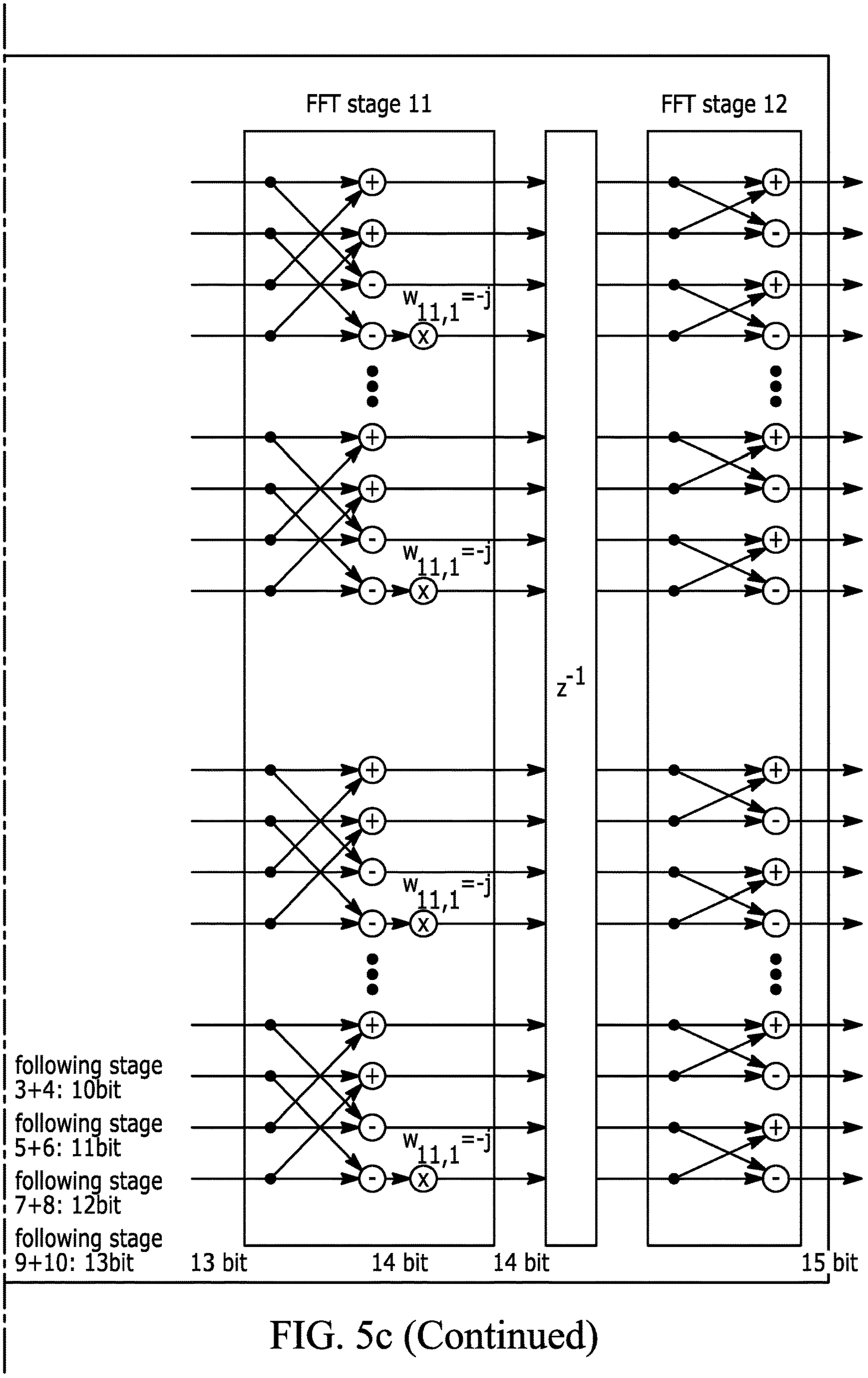
Figure 5D:
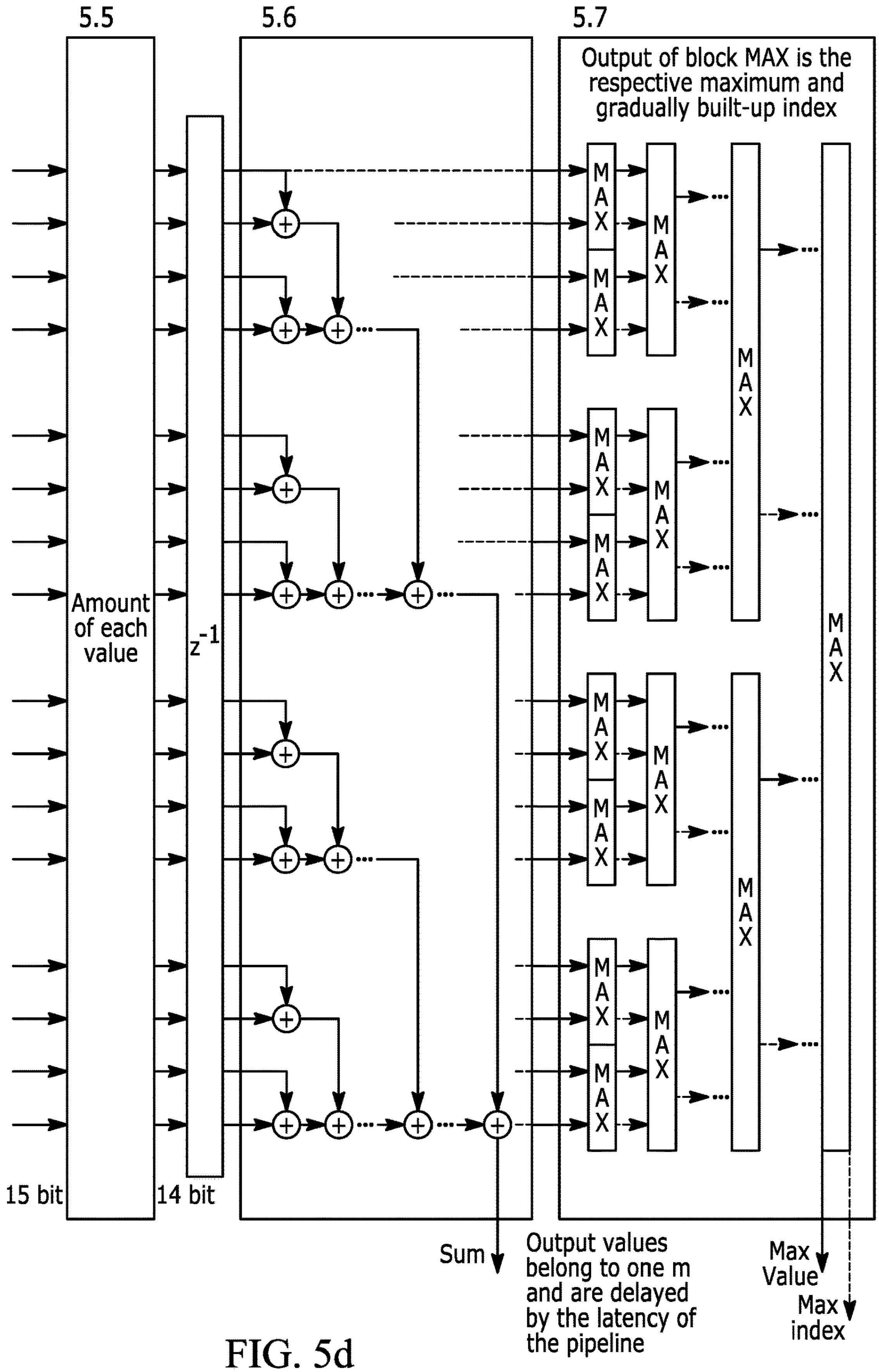

M corresponds to the largest object distance which is to be assumed or is of interest, and it is assumed for the Doppler shift k that it can assume any values. This therefore produces the two-dimensional correlation $E_{m,k}$ $$\begin{aligned} E_{m,k} &= \mathrm{sum}_{n=0,\dots,N-1}(e(n)\cdot conj(\hat{e}_{m,k}(n)) \\ &= \mathrm{sum}_{n=0,\dots,N-1}(e(n)\cdot b(n-m)\cdot\exp(- \\ &\quad j2\pi\cdot n/N\cdot k)),\ m = 0, \dots, M-1 \text{ and } k = 0, \dots, N-1 \end{aligned}, \tag{5}$$

wherein "conj" denotes the complex-conjugate formation and the modulation sequence b(n) does not alter because of its real-valuedness. The correlation $E_{m,k}$ has peaks (often referred to as power peaks) at the positions $(m,k)=(m_{0,i},k_{0,i})$ of objects; FIG. 4 shows the amount of the two-dimensional correlation for two objects of the same receive amplitude at $(m_{0,1},k_{0,1})=(150, 500)$ and $(m_{0,2},k_{0,2})=(50, 3000)$. In a further signal processing step, the peaks are established, and the distance of the objects is subsequently determined from their values $m_{0,i}$ and the radial relative speed is determined from $k_{0,i}$; that is to say, the distance and relative speed of multiple objects can be immediately and clearly determined from a modulation sequence. This is a great advantage over the linear frequency modulation frequently utilized in the case of coherent lidar systems having two frequency ramps, the slopes of which have opposite algebraic signs—this can result in ambiguities even in the case of an individual object, and these are unavoidable in the case of multiple objects.

The calculation of the two-dimensional correlation and its downstream evaluation take place in the digital signal processing unit 1.11. It constitutes a high expenditure with the order of N·M·N. However, the above relationship (5) can also be considered as a discrete Fourier transform over the product e(n)·b(n−m), n=0, . . . , N−1 which is to be determined for each m=0, . . . , M−1; the discrete Fourier transform (DFT) is calculated by way of the fast Fourier transform (FFT):

$$E_{m,k} = FFT_k(e(n)\cdot b(n-m)),\ m = 0, \dots, M-1, \tag{6}$$

wherein k=0, . . . , N−1 is the output dimension of the FFT, that is to say the discrete frequency, so that the computing expenditure is reduced to the order of $M\cdot N\cdot\log_2(N)$.

The previously considered received signal e(n) of the period of time n=0, 1, . . . , N−1 and the associated correlation $E_{m,k}$ refer to an individual capturing direction, that is to say based on the horizontal and vertical direction, to one pixel. In actual fact, roughly 160,000 capturing directions, that is to say pixels, are covered in each capturing cycle of 50 ms; this is typically realized by a combination of parallel transmitter and receiver, that is to say parallel capturing of pixels, and scanning, that is to say sequential capturing of pixels. A parallel transmitter and receiver means that all of the elements 1.4-1.10 in FIG. 1 exist several times, e.g., 64 times. The scanning can happen, e.g., thanks to sequential switching or thanks to continual mechanical movement (e.g., of a mirror); during continual scanning; it is also possible that pixels partially overlap, that is to say that the back ones of the N values of the received signal e(n) of a pixel are also utilized as front values of the next pixel. If it is now assumed that M=250 (corresponding to the maximum distance of 250 m in the case of the above interpretation), then the FFT of length 4096 from relationship (6) is to be calculated 800 million times per second. It is not possible to realize this many FFT calculations by way of microprocessors or DSPs (Digital Signal Processors); the clock frequency of such processors is typically in the range of 1 GHz, i.e., almost one complete FFT of the length 4096 would have to be calculated per clock frequency, but modern processors can, as a general rule, only carry out up to the order of 100 multiplications and additions per clock frequency, even when using parallel vectorial computing units, which is several orders of magnitude below the requirement for an FFT of length 4096. For this reason, it is only possible to implement this many FFTs by way of special computing logic implemented in hardware. Since the FFT algorithm consists of many sub-elements which are referred to as butterflies, multiple butterflies, which contain a programmable multiplier, are frequently implemented for a special computing logic of the FTT in hardware, since the twiddle factor to be multiplied alters over the sequence of the butterflies. Admittedly, the realization of programmable multipliers is complex.

Since the number of the FFTs to be calculated per second, 800 million, roughly corresponds to the realizable clock frequency of 1 GHz of such computing logic, programmable multipliers can be dispensed with, by realizing each butterfly of the FFT and, consequently, each adder and multiplier contained therein (for the corresponding twiddle factor), in a dedicated manner, directly in the computing logic. This is depicted in block 5.4 in FIG. 5; a FFT of length 4096 consists of $\log_2(4096)=12$ sequential stages, and in each of these stages there are 2048 butterflies which, in each case, determine two output values from two complex-valued input values via a complex-valued addition and subtraction as well as a complex-valued multiplication (a butterfly is highlighted, by way of example, by thick lines in the first FFT stage in FIG. 5). Since the many sequential computing operations cannot be calculated in one clock frequency, registers for buffering must be inserted; such buffer memories, symbolized by the blocks $z^{-1}$, are inserted in FIG. 5 between each of the 12 FFT stages—actually, it can be even more since, for example, the supply lines of the first stages are very long and, if necessary, further buffer memories are required there. Therefore, the calculation takes place in a so-called pipeline—the calculation of a FFT runs over multiple clock frequencies and data from multiple FFTs are located in the computing circuit; each clock frequency, the input data of a FFT are fed into the computing circuit which is embodied as a pipeline, the result, that is to say the output data from the FFT, is then available at the output of the computing circuit following multiple clock frequencies, so that the result of a new FFT is obtained each clock frequency.

The main expenditure for realizing such computing logic relates to the multipliers. The product between complex-valued signals and the twiddle factors $$\begin{aligned} w_{p,q} &= \exp(-j\pi\cdot 2^p\cdot q/N) \\ &= \cos(\pi\cdot 2^p\cdot q/N) + j\cdot\sin(-\pi\cdot 2^p\cdot \\ &\quad q/N) \text{ with } p=1,\ldots,\log_2(N)-1 \text{ and } q=1,\ldots,N/2^p-1 \end{aligned},\tag{7}$$

that is to say unit indicators (amount=1), is formed in them; in general, four real-valued multipliers are needed for this. Each of these real-valued multipliers is typically realized by numerous additions of moved values. Admittedly, there is no requirement for a high degree of accuracy of the factors here; for example, an error of up to 1/32 can be tolerated, i.e., the quantized values $$w_{p,q} = 1/16\cdot \text{round}(16\cdot\cos(\pi\cdot 2^p\cdot q/N)) + j\cdot 1/16\cdot\text{round}(-16\cdot\sin(\pi\cdot 2^p\cdot q/N))\tag{8}$$

can be used; in this case, "round" designates the rounding function. The noise generated by the rounding at the output of the correlation $E_{m,k}$ lies below the required dynamic range and also typically below the effect of the receiver noise; and the signal loss due to the noise can also be neglected. Therefore, multipliers by the factors ±1/16, ±2/16, . . . , ±15/16 still have to be realized. As an example, the multiplier by the factor 7/16 is considered; due to $$7/16 = 8/16 - 1/16 = 1/2 - 1/16 = 2^{-1} - 2^{-4}$$

it can be realized by a subtraction of the input value moved four places to the right from the input value moved one place to the right—this assumes a binary number representation; the above representation of 7/16 is called CSD code (canonical-signed-digit code). With the exception of the factors ±11/16 and ±13/16, all of the above factors can be realized in accordance with relationship (8) with a maximum of one addition or subtraction; to avoid having to deploy two additions or subtractions for these factors ±11/16 and +13/16, they are approximated by ±10/16 and ±14/16, which still leads to acceptable quantization noise.

The complex-valued multiplier for the twiddle factor $$w_{2,740} = 1/16^*(-10 - j^*12) = (-2^{-1} - 2^{-3}) + j^*(-2^{-1} - 2^{-2})$$

is depicted in FIG. 6; the output value $o=o_{Re}+j\cdot o_{Im}$ of the same length arises from the binary input value $i=i_{Re}+j\cdot i_{Im}$ with length 9 bit following multiplication, wherein numerical values are entered as an example. Two real-valued multipliers are to be realized in each case by one adder respectively for the real and imaginary part of the output value; thereafter, the two partial results for the real and imaginary parts are, in each case, to be added. Since the negative of the real and imaginary part of the input value is also required, an inversion takes place. The inversion is simply realized here by bit inversion, i.e., the supplementary addition of 1, that is to say a so-called LSB (least significant bit) is omitted; the error arising can be compensated for by adding correction values to the input values of the FFT—to this end, the effect of these missing values 1 at the output of the FFT during the inversion can be determined and converted to the input via an inverse DFT. The rear part is also simply omitted, including when moving the binary values to the right (for realizing the multipliers), that is to say no rounding is performed; the errors arising contain mean values, and their mean errors can also be compensated for again by way of adding correction values to the input values of the FFT. On being moved right, the bit length of the value remains unchanged; to this end, only the uppermost bit of the input value has to be extended accordingly, that is to say copied, in the case of the representation of the two complement's considered here. The process of moving to the right itself is simply realized by way of appropriate wiring and, consequently, does not require any expenditure. Since the twiddle factors to be multiplied always have the amount 1, input and output values of the multipliers have the same value range; that is to say, no additional bits have to be extended upwards. It should also be noted that on being moved right, the omission, that is to say, the truncation of the bits moved out generates a small error containing a mean value; the mean error can also be compensated for again by adding correction values to the input values of the FFT.

A complex-valued addition and subtraction of two complex-valued values takes place, in each case, in the butterflies; that is to say, the amount of the result can be twice as large as the amount of the input values, so that the value range has to be extended upwards by one bit. As a result, the bit length would increase by 12 over the 12 stages of the FFT. Admittedly, the noise component of the values originating from the receiver noise also increases over the additions and subtractions and, indeed, on average by $\sqrt{2}$ in terms of amplitude. That is to say that, following two stages, in each case, the noise amplitude doubles. For this reason, the least significant bit, that is to say the LSB, can be omitted in each second stage (that is to say, it is then scaled by the factor 0.5); the quantization noise generated by this lies below the effect of the receiver noise, since the value range at the input of the FFT is selected such that the receiver noise already has the amplitude of multiple LSBs there. The effect of the simple omission of the LSBs (that is to say, without rounding), that is to say the mean errors arising as a result, can also be compensated for by adding correction values to the input values of the FFT. In the circuit according to FIG. 5, the scaling is omitted in the last stage since there are no further computing steps within the FFT, which would benefit from a reduction of the bit length; consequently, the bit length grows over the FFT from 8 bits at the input to 15 bits at the output.

According to FIG. 5, the FFT is executed in a structure with decimation in frequency (decimation in frequency FFT) to have the longest lines of the structure and the nontrivial multiplications in the front stages with their lower bit length (there are no multiplications in the two rear stages; the factor j only represents the corresponding wiring). In addition, with this structure, a resorting of the input data in the form of long lines is avoided; a resorting of the output data into their natural chronological order is not required here for the further processing. Therefore, this structure requires less implementation expenditure than the alternative FFT structure with decimation in time (decimation in time FFT).

According to relationship (6), the FFT can be applied to the product between the received signal e(n) and the shifted modulation sequence b(n-m) in order to determine the correlation $E_{m,k}$. However, due to the cyclical nature of the modulation sequence b(n) (it has period N), the product can also be formed between the unshifted modulation sequence b(n) and the cyclically shifted received signal e(mod(n+m, N)), where *mod' represents the modulo function to module N, and the FFT applied thereto:

$$E_{m,k} = FFT_k(e(\mathrm{mod}(n+m, N)) \cdot b(n)),\ m = 0, \ldots, M-1; \quad (9)$$

the values of this correlation differ from those of relationship (6) in phase, but are identical in amount and only the latter is relevant for the further evaluation, so that the same symbol is utilized here for the sake of simplicity (this relationship results from the time shift offset of the Fourier transform). The product between the cyclically shifted received signal e(mod(n+m,N)) and the modulation sequence b(n) is formed in block 5.2 in FIG. 5 and is realized via a switchable inverter; for values 1 of b(n), the input value remains unchanged, for values −1, it is simply inverted bit by bit—the effect of omitting the addition of a LSB, which is actually necessary during the inversion, is compensated for by adding correction values to the input values of the FTT in block 5.3. It should be noted that the switchable inverters are only necessary if the modulation sequences can alter—if not, hard implementation of the inversion is then possible and, of course, only where it occurs. The cyclical shifting of the received signal is realized over the chain of the registers $z^{-1}$, into which the received signals are initially loaded.

Previously, in block 5.1, a correction signal $c_1(n)$ is added to the received signals, which serves to compensate for the effects of couplings and reflections within the lidar system or its immediate surroundings, in particular a cover.

As already explained above, in order to simplify calculations, pure truncation is utilized for quantization and purely bit inversion is utilized for inversion; the effects of the errors containing mean values which arise are compensated for by addition of correction values $C_2(n)$ in block 5.3 prior to the FFT. The correction stage could also be realized following the FFT instead of prior to the FFT.

Following the FFT, that is to say following the formation of the correlation $E_{m,k}$, the result is still processed further. The amount for each of the N=4096 complex values is initially formed in block 5.5. Since a high degree of accuracy is not required here, the following approximation can be utilized for the amount |i| of the complex value $i=i_{Re}+j\cdot i_{Im}$:

$$|i| = \max(u + v/8,\ u - u/8 + v/2) \text{ with } u = \max(|i_{Re}|, |i_{Im}|) \text{ and } v = \min(|i_{Re}|, |i_{Im}|), \quad (10)$$

wherein "max" and "min" denote the maximum and minimum function; the calculation can be implemented with little logic expenditure.

The amounts of the N=4096 values calculated in this way go both into block 5.6 for totaling and into block 5.7 for formation of the maximum. Both blocks are configured in a cascaded form; in each of the 12 stages, the sums or the maximums of value pairs are formed in each case. Required registers between the stages are not depicted.

The totaling is required in order to estimate the noise level in order to be able to distinguish peaks of the correlation, which are generated by objects, from noise peaks. Since there are only very few peaks generated by objects in the correlation, that is to say, most of the values only represent noise, the sum following division by 4096, that is to say, moving right by 12 bits, supplies a good estimate of the noise level.

The determination of the maximum establishes the maximum amount and the associated index k of N=4096 FFT output values for the respective shift m (which corresponds to the distance), that is to say, in the Doppler dimension, i.e., relative speed dimension. If the maximum is above the estimated noise by a factor of at least 3, it is deemed to be generated by an object; the distance and relative speed of the object can be determined from the associated shift $m=m_0$ and Doppler index $k=k_0$, its reflectivity can be determined from the level. If, as depicted in block 5.7, only the absolute maximum is determined, only the most reflective object in the respective pixel can be determined at a distance. If the aim is to cover the very unlikely case that there are two objects having different relative speeds in one pixel at one distance (that is to say, for instance, the range of one meter), the respective maximum of multiple value blocks could also be output—due to the cascaded construction of the search for the maximum, e.g., of 8 equally long blocks. If the input data of the search for the maximum are arranged appropriately, multiple blocks can also be utilized so that an interpolation of the peak in the FFT can be performed for a more precise relative speed; because the peak is typically seen in two adjacent FFT values (since it does not lie—as previously considered—at an integral Doppler index $k_0$) and, if the input data are arranged appropriately, these are in different blocks of the search for the maximum, both values are obtained thereafter.

It should also be commented that no window function, that is to say no multiplication of the input values of the FFT by a kind of bell curve, is utilized for the FFT; this would only be necessary or useful if two objects having a similar relative speed and notably different reflectivity can occur at the same distance in one pixel and are to be separated. In particular, when no window function is utilized at the input of the FFT, the sensitivity at the output of the FFT is then reduced (that is to say, the detection capacity of objects having weak reflectivity and high distance) when the Doppler index $k_0$ corresponding to the relative speed is not integral, that is to say, the peak is divided between two adjacent FFT values. The effect can be reduced by selecting the length of the FFT to be higher than that of its input signal, i.e., zeros are appended to the input signal, which is referred to as zero padding.

With regard to the index determination in the search for the maximum, it should be commented that this can be built up very easily bit by bit, beginning with the LSB due to the cascaded realization; at the output of each comparison of two values, in addition to the current maximum value, there is also an index value, the bit length of which corresponds to the number of the stage. The index thus arising refers to the linear numbering at the input of the search for the maximum; since the numbering at the output of the FFT is scrambled with respect to the Doppler index k, another conversion/mapping has to be performed later.

In the case of the design considered here (modulation time $T_m$=6.67 ns), the clear relative speed range at the output of the FFT is about +210 km/h and is therefore in the area of the region of interest. In the case of a considerably smaller modulation time, only a part of the relative speed range would be of interest at the output of the FFT. A decimation could then be performed prior to the FFT, that is to say following multiplication between the shifted received signal and modulation sequence, in order to reduce the length of the FFT; in the simplest case, such a decimation is effected by formation of subtotals of the product sequence.

That is to say, at the output of the hardwired digital circuit, which is depicted in FIG. 5, information about whether and at which relative speed there is an object in the respective pixel and the distance considered in each case accumulates every clock frequency, that is to say roughly every nanosecond. The received signal e(n) of one pixel is loaded into the registers once and is then retained over M=250 clock frequencies with cyclical moving sideways (for the 250 different shifts m and, therefore, different distances). Following M=250 clock frequencies, the received signal of the next pixel is then loaded. In this way, all of the, e.g., 160,000 pixels of a capturing cycle with a 50 ms duration are gradually evaluated.

The logic of the digital circuit according to FIG. 5 mainly consists of adding—about 300,000 adders having the length 12 bits on average are required. Due to the ever-shrinking structural sizes of semiconductor technologies for digital circuits, the realization of such an extensive hardwired circuit can be made possible—both in terms of costs and power consumption. Compared to frequency modulation, phase modulation moves the implementation expenditure for coherent lidar systems more into the digital realm (since the analog part becomes simpler); due to the constant and rapid progress of semiconductor technology for digital circuits, this results in a more cost-optimal, i.e., less expensive solution.

An alternative structure to FIG. 5 is to now be considered. The two-dimensional correlation $E_{m,k}$ according to relationship (5) can also be seen as a one-dimensional temporal correlation between the received signal e(n) and sequence b(n)·exp(−j2π·n/N·k), which is performed for each k:

$$E_{m,k} = CC_m\left(e(n),\, b(n)\cdot\exp\left(-j2\pi\cdot n/N\cdot k\right)\right) \text{ with } k=0,\ \ldots,\ N-1, \tag{11}$$

wherein "$CC_m$" means the cyclical correlation between the two sequences of length N and where m=0, . . . , N−1 is the dimension at the output of the correlation; that is to say that since N>M in the design under consideration, more discrete distances m than required are processed by the cyclical correlation.

A cyclical correlation in the time range corresponds to a multiplication of the discrete Fourier transforms in the frequency range:

$$E_{m,k} = IFFT_m\left(FFT(e(n))\cdot FFT\left(b(n)\cdot\exp\left(-j2\pi\cdot n/N\cdot k\right)\right)\right) \text{ with } k=0,\ \ldots,\ N-1, \tag{12}$$

wherein $IFFT_m$ means the inverse fast Fourier transform and m=0, . . . , N−1 is its output dimension (here, it is already assumed that the DFT is realized by way of a FFT). According to the set of frequency shifts of the Fourier transform, the factor exp(−j2π·n/N·k) applied to the modulation sequence b(n) in the time range means a shift in the frequency range, that is to say of the Fourier transform:

$$E_{m,k} = IFFT_m(E(l)\cdot B(l+k)) \tag{13}$$

$$\text{with } E(l) = FFT_l(e(n)),\ B(l) = FFT_l(b(n)) \text{ and } k=0,\ \ldots,\ N-1;$$

due to the set of frequency shifts of the Fourier transform and the cyclical nature of the discrete Fourier transform, the following further transformations can be conducted for the amount of the correlation:

$$\begin{aligned} |E_{m,k}| &= |IFFT_m(E(l-k)\cdot B(l))| \\ &= |IFFT_m(E(\mathrm{mod}(l-k,\ N))\cdot B(l))| \end{aligned} \tag{14}$$

$$\text{with } E(l) = FFT_l(e(n)),\ B(l) = FFT_l(b(n)) \text{ and } k=0,\ \ldots,\ N-1.$$

This relationship can be implemented in a structure similar to that depicted in FIG. 5. Input values of the structure are the FFT of the received signal which is to be calculated in advance. It is multiplied, in a form cyclically shifted by k, by the previously determined FFT of the modulation sequence b(n). An inverse FFT (IFFT) which only differs from the FFT in terms of the algebraic sign of the twiddle factors comes thereafter; the output dimension of the IFFT is the distance dimension m (in the case of the structure according to FIG. 5, it is the relative speed dimension k), i.e., for a discrete relative speed k, the two-dimensional correlation $E_{m,k}$ is present over the distance dimension m=0, . . . , N−1. This is then followed again by an absolute-value formation and then a totaling and maximum formation, now over the distance dimension; since there can be multiple reflections having a different distance and the same relative speed in one pixel (e.g., from fog plus, if necessary, stationary object), multiple maxima should be determined here.

If the same modulation sequence b(n) is always utilized, the multipliers can be implemented in a hardwired form for the realization of the product E(mod(I-k,N))· B(I)— thanks to approximation and CSD representation, only a small implementation expenditure is then necessary. If the modulation sequence alters, programmable multipliers will be necessary, which will mean considerably more implementation expenditure.

As explained above, in the case of N>M (N≈16M) assumed here, many more discrete distances m=0, . . . , N−1 than required are processed. This can be circumvented by performing a decimation prior to the IFFT—in the case of a decimation by the factor 16, only 256 values then arise from the N=4096 values, which are fed into the IFFT; in the simplest case, the decimation is realized by adding, in each case, 16 adjacent values. Therefore, instead of the original dimension 4096, the IFFT only has the dimension 256 and therefore requires much less implementation expenditure; with its length 256, the full range of distances of length M=250 is also still covered.

Admittedly, it should be taken into consideration that such a structure has to be cycled through N=4096 times per pixel (so many shifts have to be carefully calculated for the FFT of the input signal); that is a good factor 16 more than in the structure according to FIG. 5, which, with a clock rate of roughly 1 GHz, does however already lie at the maximum of what can be realized. For this reason, this alternative structure to relationship (14) would have to be built up multiple times, which more than nullifies the advantage of the shorter length of the IFFT. Such an alternative structure then makes sense if the product of the modulation length N and the number of pixels is so low that the structure is only required a few times, preferably once.

In the lidar system considered so far according to FIG. 1, the mixer has a complex-valued design, which constitutes a notable additional expenditure (virtually double) with respect to a real-valued mixer for the receive path. When using a real-valued mixer, only the amount of the relative speed could be established, not the algebraic sign, since there are two peaks at $(m_0,+k_0)$ and $(m_0,-k_0)$ in the correlation $E_{m,k}$. To establish the algebraic sign, approaches by way of plausibility checking and/or tracking, i.e., pursuing over multiple acquisition cycles, would be necessary. Alternatively, a complex-valued modulation sequence, e.g., consisting of the 4 values +1, −1, +j and −j between which a selection is made pseudo-randomly, can be used; then there is again only one peak at $(m_0,+k_0)$ in the correlation $E_{m,k}$. It is true that the production of such a complex-valued sequence does require an increased circuit complexity, but this is only required once, whereas the expenditure for a complex-valued receiver is incurred multiple times in the case of a parallel receiver. In the case of a complex-valued modulation sequence, the conjugated complex of the modulation sequence is to be utilized for the correlation. Alternatively, the conjugated complex of the receive sequence can also be utilized, provided that this is complex-valued.

So far, the case has been considered that the modulation time $T_m$ is equal to the sampling repetition time $T_s$. It could happen in the case of an ideal rectangular modulation signal, which retains its ideal shape even in the received signal, that it is sampled exactly at the edge where no meaningful information can be obtained. In order to avoid this, either the sampling repetition time $T_s$ of the received signal can be provided so that it is smaller, e.g., half the size of the modulation duration $T_m$, or the form of the modulation sequence is either directly distorted, e.g., to an approximately triangular shape, when it is generated or in the receiver. In the correlation $E_{m,k}$, one peak is then typically obtained in two consecutive discrete distances m and an interpolation can be performed over its values in order to determine the distance more accurately.

The invention claimed is:

1. A coherent lidar system for capturing surroundings of a vehicle, comprising:

a transceiver unit configured to emit a phase-modulated signal with pseudo-random change over discrete phase values;

the transceiver unit further configured to receive signals reflected from objects, the signals being delayed with respect to the emitted signal by the distance-dependent transit time and are shifted in frequency by the relative speed-dependent Doppler effect;

a mixer for mixing the received signals;

an analog-to-digital converter configured to convert the mixed signals into a digital signal;

a digital signal processor for correlation filtering of the low-frequency received signal, wherein the correlation filtering is two-dimensional due to the two variable dimensions of time shift and frequency shift of signals reflected by objects, and the two-dimensional correlation filter includes a hardwired digital circuit embodied as a pipeline, wherein multiple or all of the output values are determined per clock frequency of the digital circuit in one of the two dimensions, and over a sequence of clock frequencies in the other dimension.

2. The lidar system according to claim 1, in which signal multiplications required for a spectral transformation are realized with twiddle factors in the hardwired digital circuit by a few additions and/or subtractions of shifted signal values, wherein a maximum of one addition or subtraction is utilized in order to realize a real-valued multiplication.

3. The lidar system according to claim 1, wherein a bit length used alters over the pipeline stages of the hardwired digital circuit and is only large enough for the quantization noise produced in the digital circuit to not significantly increase the system noise which arises in an analog part of the transceiver.

4. The lidar system according to claim 1, wherein the hardwired digital circuit includes a front stage, in which a signal sequence or the complex-conjugated values thereof and a modulation sequence or the complex-conjugated values thereof are multiplied by a position which is shifted with respect to one another, if necessary followed by a decimation of the sequence arising from the multiplication and/or followed by an extension with zeroes and followed by a fast Fourier transform realized in multiple stages, wherein each individual computing operation is realized in a dedicated circuit and the shift between the signal and modulation sequence is altered from clock frequency to clock frequency in the first stage and the result of a Fourier transform arises at the output of the rear stage, wherein the result refers in each case to multiple cycles of previously produced output data of the front stage.

5. The lidar system according to claim 4, wherein a binary phase modulation, comprising two phase positions which differ by approximately 180°, is utilized and therefore the multiplications can be realized with the values of the modulation sequence by switchable inverters.

6. The lidar system according to claim 4, wherein the fast Fourier transform is executed in the form of a structure with decimation in frequency, in order to avoid a resorting of the input data in the form of long lines, and in order to have the longest lines of the structure and the nontrivial multiplications in the front stages with their lower bit length.

7. The lidar system according to claim 1, wherein the hardwired digital circuit includes a front stage, in which a Fourier transform of a signal sequence or the complex-conjugated values thereof and a Fourier transform of the modulation sequence or the complex-conjugated values thereof are multiplied by a position which is shifted with respect to one another, if necessary followed by a decimation of the sequence arising from the multiplication and/or, if necessary, followed by an extension with zeroes and followed by an inverse fast Fourier transform realized in multiple stages, wherein each individual computing operation is realized in a dedicated circuit, the shift between the two Fourier transforms is altered from clock frequency to clock frequency in the first stage and the result of an inverse Fourier transform arises at the output of the rear stage, wherein the result refers in each case to multiple cycles of the previously produced output data of the front stage.

8. The lidar system according to claim 1, wherein a truncation is utilized for quantizing and/or purely bit inversion is utilized for inversion, in the hardwired digital circuit, and the effects of the mean errors arising are compensated for by addition of correction values in a stage of the digital circuit.

9. The lidar system according to claim 1, wherein components of couplings and reflections within the lidar system or its immediate surroundings, in particular a cover, which are contained in the digitized received signal, are eliminated to a large extent by addition or subtraction of a compensation signal.

10. The lidar system according to claim 1, wherein the hardwired digital circuit is utilized for multiple pixels by virtue of its high throughput rate, wherein the pixels can be generated in particular by scanning light rays and/or parallel receive paths.

11. The lidar system according to claim 1, wherein the hardwired digital circuit is extended by one or more further stages in order to evaluate the result of the correlation filtering, in particular for absolute-value or power formation and downstream totaling and/or searching for the maximum.

* * * * *